United States Patent
Samuel

(10) Patent No.: US 10,883,360 B2
(45) Date of Patent: Jan. 5, 2021

(54) ESTIMATION OF WELLBORE DOGLEG FROM TOOL BENDING MOMENT MEASUREMENTS

(71) Applicant: HALLIBURTON ENERGY SERVICES, INC., Houston, TX (US)

(72) Inventor: Robello Samuel, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 398 days.

(21) Appl. No.: 15/536,101

(22) PCT Filed: Feb. 2, 2016

(86) PCT No.: PCT/US2016/016176
§ 371 (c)(1),
(2) Date: Jun. 14, 2017

(87) PCT Pub. No.: WO2016/137688
PCT Pub. Date: Sep. 1, 2016

(65) Prior Publication Data
US 2018/0003031 A1    Jan. 4, 2018

Related U.S. Application Data

(60) Provisional application No. 62/121,341, filed on Feb. 26, 2015.

(51) Int. Cl.
*E21B 47/022* (2012.01)
*E21B 47/007* (2012.01)
(Continued)

(52) U.S. Cl.
CPC .......... *E21B 47/022* (2013.01); *E21B 47/007* (2020.05); *G01B 21/20* (2013.01);
(Continued)

(58) Field of Classification Search
CPC .................................................... E21B 47/022
See application file for complete search history.

(56) References Cited

U.S. PATENT DOCUMENTS

| 4,848,144 A | 7/1989 | Ho |
| 2005/0150689 A1 | 7/2005 | Jogi et al. |
| 2005/0194185 A1* | 9/2005 | Gleitman .............. E21B 17/003 |
| | | 175/45 |
| 2010/0032165 A1 | 2/2010 | Bailey et al. |

(Continued)

FOREIGN PATENT DOCUMENTS

WO    2009/064728    5/2009

OTHER PUBLICATIONS

PCT International Search Report and Written Opinion, dated Apr. 19, 2016, Appl No. PCT/US2016/016176, "Improved Estimation of Wellbore Dogleg from Tool Bending Moment Measurements, " filed Feb. 2, 2016.

(Continued)

*Primary Examiner* — John E Breene
*Assistant Examiner* — Jeffrey C Morgan
(74) *Attorney, Agent, or Firm* — Benjamin Ford; Parker Justiss, P.C.

(57) ABSTRACT

A disclosed borehole curvature logging system includes: a drill string having a bottomhole assembly (BHA) with sensors providing actual deformation and bending moment measurements as a function of BHA position at spaced-apart intervals on the BHA; a processing system that retrieves said actual measurements and responsively generates a log of borehole curvature; and a user interface that displays the borehole curvature log. The processing system implements a method that generates the log by: providing an estimated borehole trajectory; deriving predicted deformation and bending moment measurements based on the estimated borehole trajectory; determining an error between the predicted measurements and the actual measurements; updating the estimated borehole trajectory to reduce the error; repeat- (Continued)

ing said deriving, determining, and updating to refine the estimated borehole trajectory; and converting the estimated borehole trajectory into a borehole curvature log.

18 Claims, 3 Drawing Sheets

(51) Int. Cl.
    *G01B 21/20* (2006.01)
    *G01V 11/00* (2006.01)
    *E21B 7/04* (2006.01)
    *E21B 47/18* (2012.01)
(52) U.S. Cl.
    CPC .............. *G01V 11/002* (2013.01); *E21B 7/04* (2013.01); *E21B 47/18* (2013.01)

(56) References Cited

U.S. PATENT DOCUMENTS

| | | |
|---|---|---|
| 2010/0155142 A1 | 6/2010 | Thambynayagam et al. |
| 2012/0016589 A1 | 1/2012 | Li et al. |
| 2012/0046865 A1 | 2/2012 | Heisig et al. |
| 2012/0179445 A1 | 7/2012 | Mitchell |
| 2013/0041586 A1 | 2/2013 | Schuberth et al. |
| 2014/0231141 A1 | 8/2014 | Hay et al. |
| 2015/0233229 A1* | 8/2015 | Benson ............... E21B 7/06 700/275 |

OTHER PUBLICATIONS

McSpadden, A. et. al, "Development of a Stiff-String Forces Model for Coiled Tubing," SPE-74831-MS (2002).
Gorokhova, L., et. al., "Comparing Soft-String and Stiff-String Methods used to Compute Casing Centralization," SPE-163424-PA (2014).

* cited by examiner

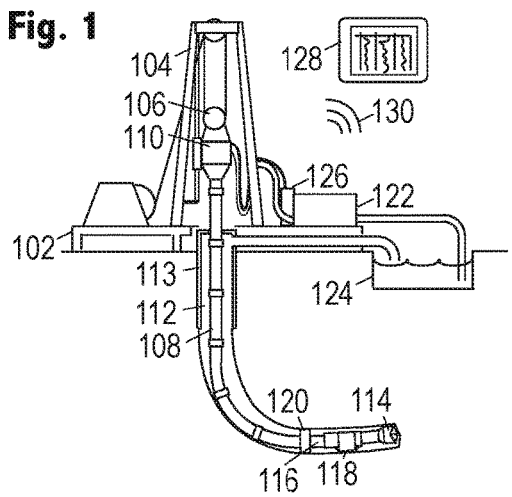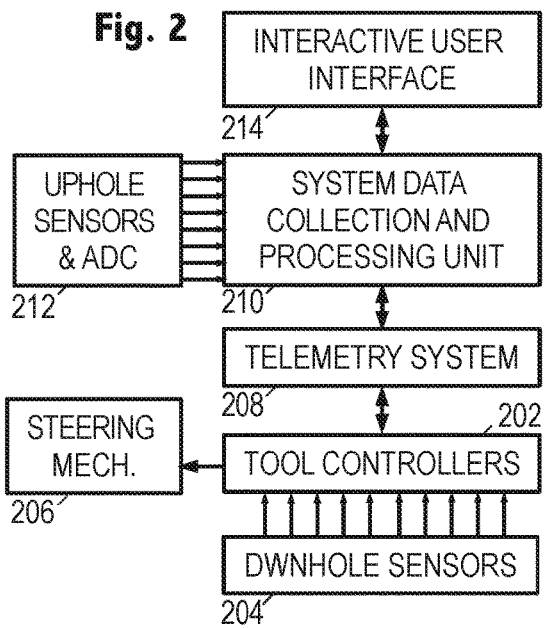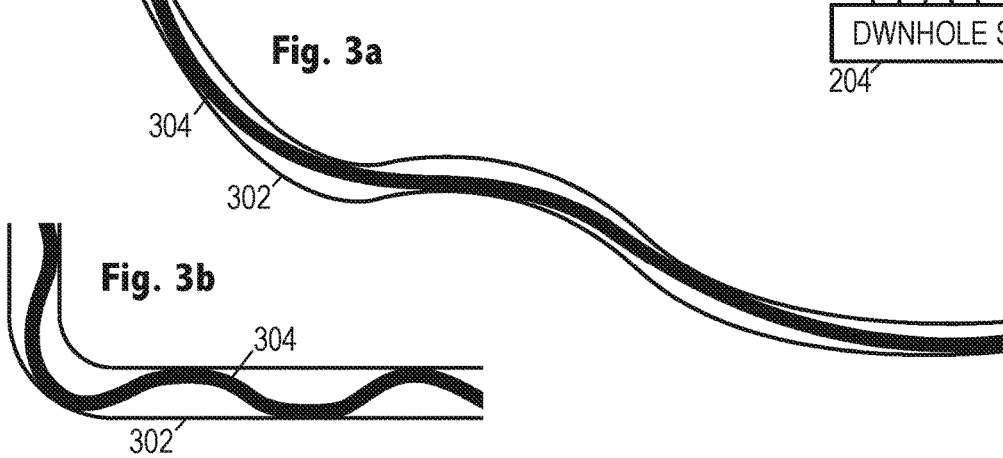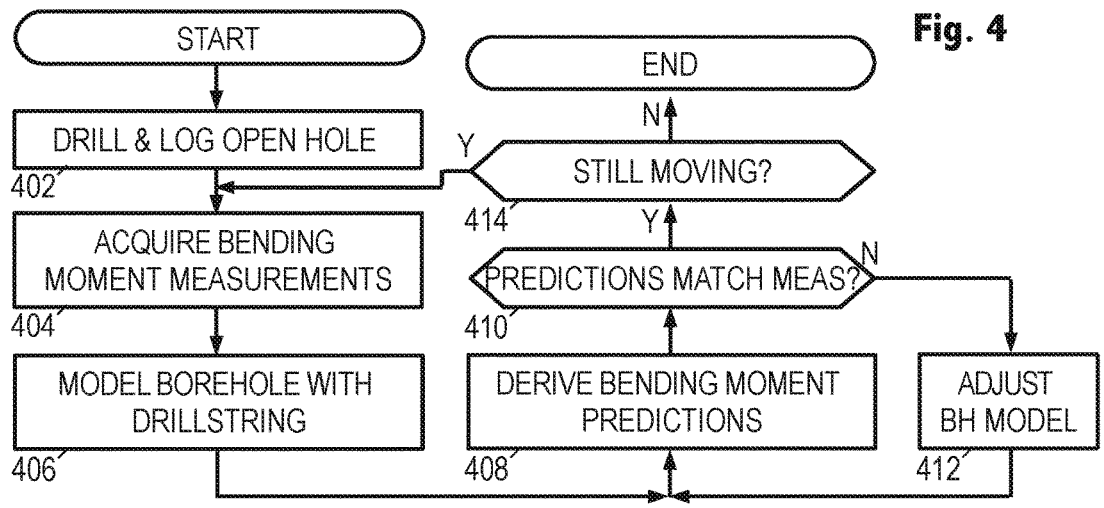

ESTIMATION OF WELLBORE DOGLEG FROM TOOL BENDING MOMENT MEASUREMENTS

BACKGROUND

Directional drilling is the process of directing the borehole along a defined trajectory. Deviation control during drilling is the process of keeping the borehole trajectory contained within specified limits, e.g., limits on the inclination angle or distance from the defined trajectory, or both. Both have become important to developers of unconventional hydrocarbon resources.

Various drill string steering mechanisms exist to provide directional drilling and deviation control: whipstocks, mud motors with bent-housings, jetting bits, adjustable gauge stabilizers, and the increasingly popular rotary steering systems (RSS). These techniques each employ side force, bit tilt angle, or some combination thereof, to steer the drill string's forward and rotary motion. However, the resulting borehole's actual curvature is not determined by these parameters alone, and it is generally difficult to predict, necessitating slow drilling and frequent survey measurements.

Among the most important trajectory parameters that need to be monitored and controlled is the wellbore dogleg, i.e., the rate at which the trajectory changes direction. The rate of such direction changes can be expressed in terms of degrees per unit length or alternatively in terms of the radius of curvature. Decreasing the curvature radius corresponds to increasing the degrees of directional change per unit length, both of which correspond to increasing the dogleg severity. Severe doglegs create a number of difficulties including casing insertion difficulty, increased friction, increased casing wear, and increased likelihood of bottomhole component trapping.

One method for measuring borehole curvature and, more specifically, dogleg severity, is to measure the bending of a bottomhole assembly as it passes along the borehole. A subtle yet important shortcoming of this method arises from the erroneous assumption that the bottomhole assembly bends in the same fashion as the borehole.

BRIEF DESCRIPTION OF THE DRAWINGS

Accordingly, there are disclosed herein systems and methods that employ improved estimation of wellbore dogleg from tool bending moment measurements. In the drawings:

FIG. 1 is a schematic diagram of an illustrative well drilling environment.

FIG. 2 is a function-block diagram of a logging while drilling (LWD) system.

FIGS. 3a and 3b are borehole cross-sections with drill-string trajectory deviations.

FIG. 4 is a flow diagram of an illustrative wellbore dogleg estimation method.

Figure 5:
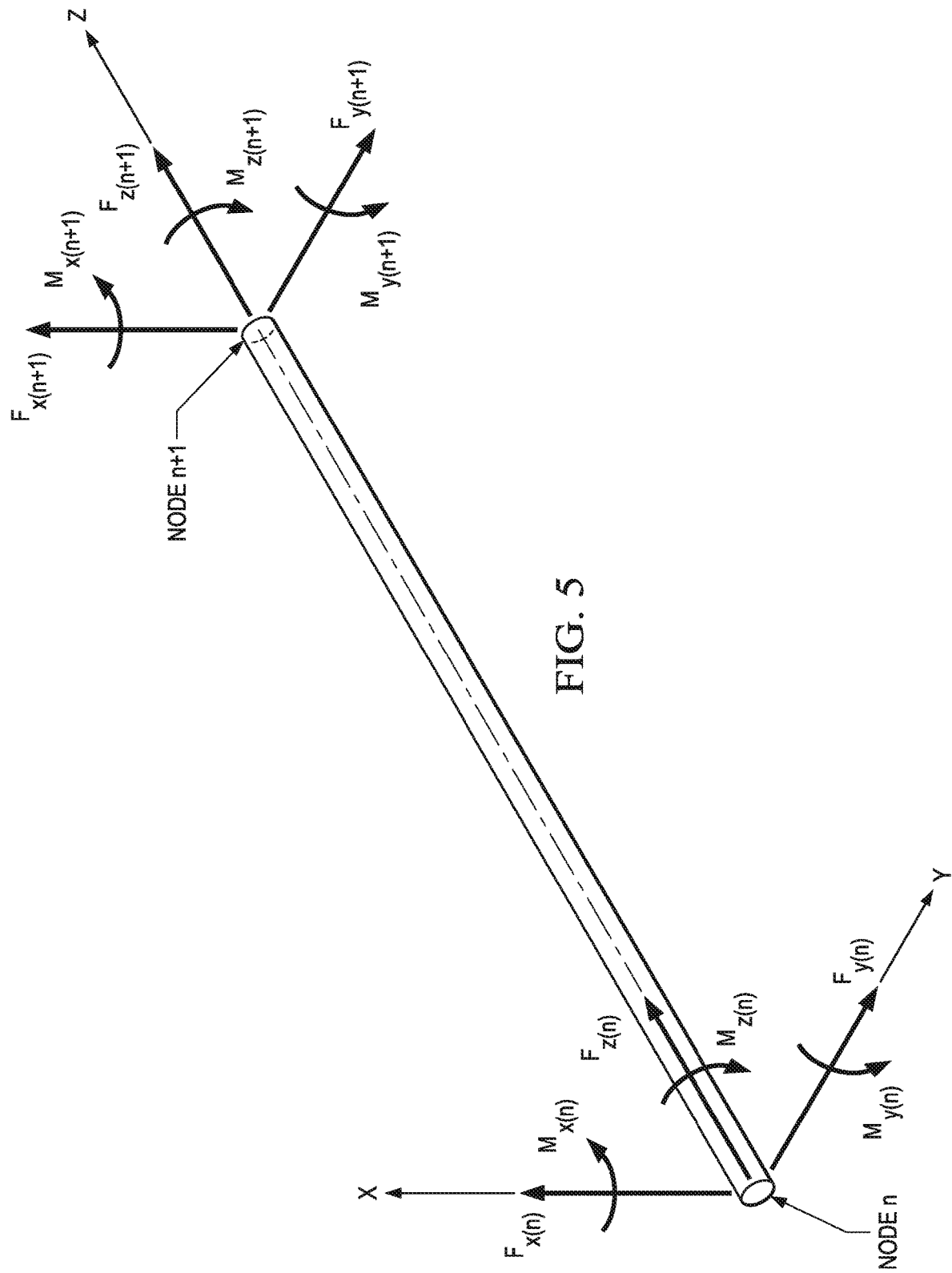
FIG. 5 is a force diagram for the end nodes of a drill string segment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

To provide context and facilitate understanding of the present disclosure, FIG. 1 shows an illustrative drilling environment, in which a drilling platform 102 supports a derrick 104 having a traveling block 106 for raising and lowering a drill string 108. A top-drive motor 110 supports and turns the drill string 108 as it is lowered into the borehole 112. The drill string's rotation, alone or in combination with the operation of a downhole motor, drives the drill bit 114 to extend the borehole. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 8, through orifices in the drill bit 114, back to the surface via the annulus around the drill string 108, and into a retention pit 124. The drilling fluid transports cuttings from the borehole 112 into the retention pit 124 and aids in maintaining the integrity of the borehole. An upper portion of the borehole 112 is stabilized with a casing string 113 and the lower portion being drilled is open (uncased) borehole.

The drill collars in the BHA 116 are typically thick-walled steel pipe sections that provide weight and rigidity for the drilling process. The thick walls are also convenient sites for installing logging instruments that measure downhole conditions, various drilling parameters, and characteristics of the formations penetrated by the borehole. Among the typically monitored drilling parameters are measurements of weight, vibration (acceleration), torque, and bending moments at the bit and at other selected locations along the BHA. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 102 to complete the telemetry link. The most popular telemetry link is based on modulating the flow of drilling fluid to create pressure pulses that propagate along the drill string ("mud-pulse telemetry or MPT"), but other known telemetry techniques are suitable. Much of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation.

Among the various types of measurement data that may be acquired by the BHA 116 are multi-component measurements of the earth's magnetic field and gravitational field at each of a series of survey points (or "stations") along the length of the borehole. The survey points are typically those positions where the navigation tool is at rest, e.g., where drilling has been halted to add lengths of drill pipe to the drill string. The gravitational and magnetic field measurements reveal the slope ("inclination") and compass direction ("azimuth") of the borehole at each survey point. When combined with the length of the borehole between survey points (as measureable from the length added to the drill string), these measurements enable the location of each survey point to be determined using known techniques such as, e.g., the tangential method, the balanced tangential method, the equal angle method, the cylindrical radius of curvature method, or the minimum radius of curvature method, to model intermediate trajectories between survey points. When combined together, these intermediate trajectories form an overall borehole trajectory.

Also among the various types of measurement data that may be acquired by the BHA 116 are caliper measurements, i.e., measurements of the borehole's diameter, optionally including the borehole's cross-sectional shape and orientation, as a function of position along the borehole.

FIG. 2 is a function-block diagram of an illustrative directional drilling system, though the illustrated modules are also largely representative of a wireline logging system. One or more downhole tool controllers 202 collect measurements from a set of downhole sensors 204, preferably but not necessarily including navigational sensors, drilling parameter sensors, and formation parameter sensors, to be digitized and stored, with optional downhole processing to compress the data, improve the signal to noise ratio, and/or to derive parameters of interest from the measurements.

A telemetry system 208 conveys at least some of the measurements or derived parameters to a processing system 210 at the surface, the uphole system 210 collecting, recording, and processing measurements from sensors 212 on and around the rig in addition to the telemetry information from downhole. Processing system 210 generates a display on interactive user interface 214 of the relevant information, e.g., measurement logs, borehole trajectory, drill string trajectory, or recommended drilling parameters to optimize a trajectory to limit estimated dogleg severity. The processing system 210 may further accept user inputs and commands and operate in response to such inputs to, e.g., transmit commands and configuration information via telemetry system 208 to the tool controllers 202. Such commands may alter the settings of the steering mechanism 206.

The software that executes on processing units 128 and/or 210, includes borehole trajectory estimation program with a drill string trajectory determination module. As illustrated by FIGS. 3*a*-3*b*, the two trajectories may be quite different. For example, in FIG. 3*a*, the drill string 304 follows a straighter trajectory than the borehole 302, while in FIG. 3*b*, the drill string 304 follows a significantly more convoluted trajectory than the borehole 302. And while the difference in radii constrains the drill string trajectory relative to the borehole trajectory, the two need not parallel each other or resemble each other on aught but the large scale. Nevertheless, for a given borehole trajectory, the drill string trajectory can be estimated using a stiff-string model or a finite element model, each of which would account for the weight (density) of the drill string, the stiffness of the drill string, and the external forces on the drill string.

As indicated by the illustrative method in FIG. 4, the borehole trajectory can be determined in the following way. As drilling and/or tripping operations are ongoing in block 402, the downhole logging tools collect navigation and (optionally) borehole geometry measurements as a function of BHA position and communicate them to the processing system. Also collected are drilling parameters as a function of BHA position, specifically including multi-component forces (or deformations) and bending moments at the bit and at selected positions along the BHA. Strain gauges may be used to provide the deformation and bending moment measurements. Multi-component forces can be measured directly using multi-component accelerometers or indirectly derived from the strain gauge measurements. Some contemplated embodiments further collect such measurements at distributed points along the drill string.

In block 406, the processing system models the borehole trajectory based on the navigation and borehole geometry measurements. This model may initially take the form of a short, straight borehole segment. As the drilling progresses, the length and shape of the model borehole iteratively gets updated, with the updated model from a previous time step being taken as the initial model for the current time step.

In block 408, the processing system employs a three-dimensional finite element analysis (3D FEA) or a stiff string analysis to derive a predicted drill string trajectory from the current borehole model, finding a drill string and BHA curvature that accounts for the boundary conditions and material properties of the drill string. The derived trajectory is used for calculating the expected multi-component deformations and bending moments. In block 410, the expected deformations and bending moments are compared to the measured deformations and bending moments from block 404. If they do not match, the system updates the borehole model in block 412, adjusting the borehole curvature and length in a fashion that reduces a mismatch error between the expected and measured bending moments and deformations for the current BHA position and all previous BHA positions.

Blocks 408-412 are repeated until the mismatch error falls below a threshold. Next, the system determines whether the drilling/tripping operations are still going. If so, blocks 404-414 are repeated to obtain and apply the new measurements. Otherwise, the method completes, yielding a robust estimation of the borehole trajectory that does not presume any equivalence with the drill string trajectory. Moreover, the estimated borehole trajectory takes into account the boundary conditions of the drill string.

We now turn to a more detailed discussion of one approach for deriving a drill string trajectory and updating a borehole path. It employs Finite Element Analysis (FEA), a mathematical method of solving a complex problem by breaking it into several smaller problems. Each of the smaller problems is then solved and their solutions combined to solve the complex problem. The following are taken into account as part of the problem formulation: (1) Tubular stiffness in bending; (2) Tubular joint to hole wall clearance; (3) Stiffness modified for compressive force; (4) Single point weight concentrations. The derived drill string trajectory yields the following: (1) Side forces, including drag and torque; (2) Bending stresses; (3) Pipe position in the hole.

The FEA may be performed as a real-time calculation that is updated as measurements are acquired, or as a stand-alone calculation that is performed after measurement collection is complete. In either case, hole curvature can be modeled in reverse, i.e., by casting the situation as one having a curved pipe inside a straight borehole. Internal moments and forces are applied which would be required to bend the segments between adjacent nodes in the required curvature but in the opposite direction. In this way the curvature may be handled consistently throughout the sections being analyzed. It does not suffer from the frame-of-reference distortion that is often problematic with finite element solutions. This approach also enables the stiff string model to manage large deflections. This curvature formulation applies equally in both build (inclination change) and walk (azimuth change).

Figure 6:
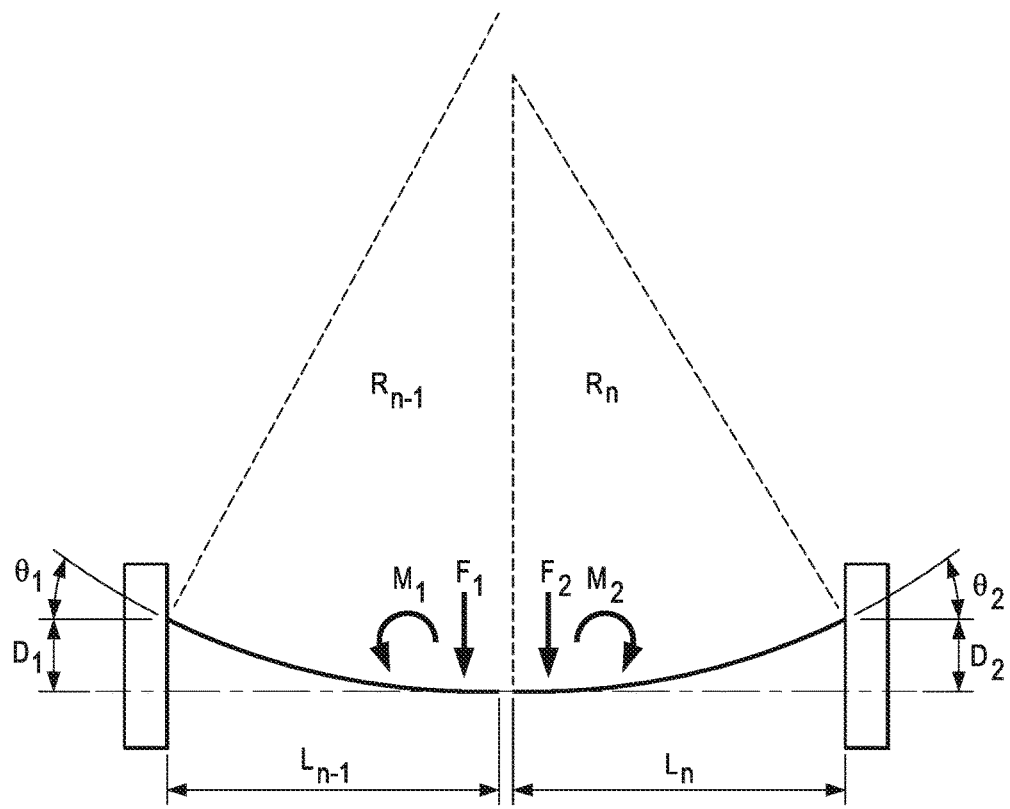
FIG. 6 is a diagram showing local curvature radii for drill string segments on each side of a given node.

FIG. 5 illustrates how the internal forces and bending moments may be defined for the nodes at each segment along the drill string. At node n, we have force components $F_{x(n)}$, $F_{y(n)}$, $F_{z(n)}$, and bending moments $M_{x(n)}$, $M_{y(n)}$, $M_{z(n)}$, respectively along the x, y, and z axes. (The axial force may also be represented as $P_n$, which is positive whenever the axial force is compressive.) These can be iteratively derived from the drill string trajectory that has been derived from an estimated borehole trajectory. The derived drill string trajectory provides a local curvature radius $R_n$ at each segment, as indicated in FIG. 6. The segments are stiff "beams" of length $L_n$, horizontally separating end nodes that are vertically displaced by distances $D_n$. The beams have a curvature stiffness of $K_n$ and a stiffness factor S. The beams are presumed to have a constant weight per length W that translates into a fixed end moment (FEM) $M_s$. The inclination angle at each node is represented by $\theta_n$ (when relative to horizontal) or $A_n$ (when relative to a baseline between nodes).

Figure 7:
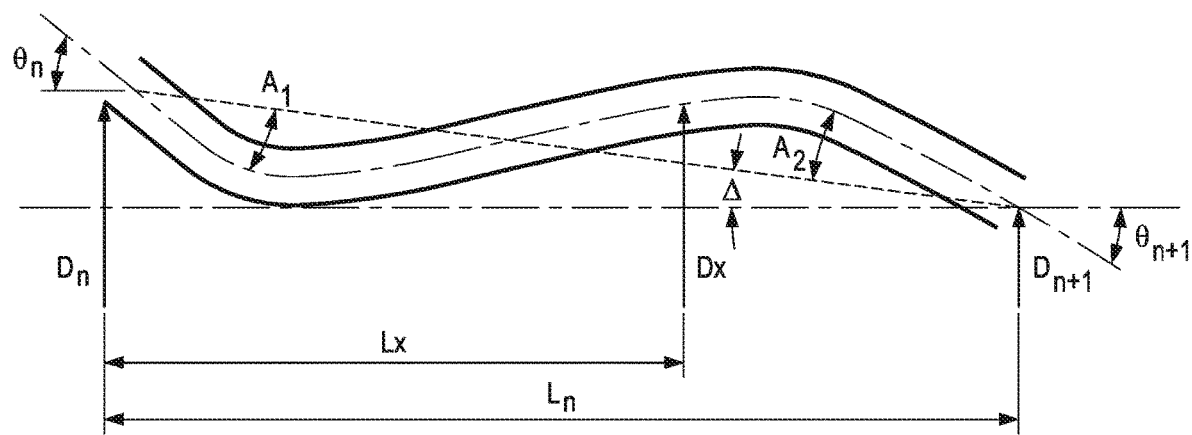
FIG. 7 is a diagram showing trajectory interpolation between nodes.

The curved trajectory between nodes can be interpolated as a cubic spline as indicated in FIG. 7. The resulting angle, displacement, and curvature along the baseline between the nodes is:

$$Ax = \Delta + 4 \cdot FEM_n \cdot (x - 3x^2 + 2x^3) + A_1 + 3(A_1 + A_2) \cdot x^2 - 2(2A_1 + A_2) \cdot x$$

$$Dx = D_1 + \Delta \cdot x \cdot L_{n-2} \cdot L_n \cdot FEM_n \cdot (x^2 - 2x^3 + x^4)/SK_n -$$
$$L_n \cdot (A_1 \cdot x + (A_1 + A_2) \cdot x^3 - (2A_1 + A_2) \cdot x^2)$$

$$Cx = \frac{\delta\theta}{\delta L} = (4 \cdot FEM_n \cdot (1 - 6x + 6x^2)/SK_n +$$
$$6 \cdot (A_1 + A_2) \cdot x - 2 \cdot (2A_1 + A_2))/L_n$$

where, with reference to FIG. 7, we have (with the small angle approximation):

$$\Delta = (D_{n+1} - D_n)/L_n$$

$$A_1 = \theta_n + \Delta$$

$$A_2 = \theta_{n+1} + \Delta$$

$$x = L_x/L_n$$

The foregoing equations account for both causes for the curvature of the string: (1) the cubic spline that join nodes n and n+1; and (2) the weight distribution in the drill string causing a natural sag in the middle. In the case of a string that has no external upset (tool joint), the effect of weight may be ignored.

To determine the transferred force and moment from the previous node, the following equations may be used (with reference to FIG. 6):

$$\theta_1 = L_{n-1}/R_{n-1}$$

$$D_1 = 0.5\theta_1 \cdot L_{n-1}$$

$$M_1 = SK_{n-1} \cdot C_{n-1} \cdot \theta_1 - T_{n-1} \cdot D_1$$

$$F_1 = -T_{n-1} \cdot \theta_1 - S_{n-1} \cdot D_1$$

where $T_n$ and $S_n$ are calculated as below $$S_{n-1} = (P_{n-1} - 2T_{n-1})/L_{n-1}$$

$$S_n = (P_n - 2T_n)/L_n$$

$$T_{n-1} = SK_{n-1} \cdot (1 + C_{n-1})/L_{n-1}$$

$$T_n = SK_n \cdot (1 + C_n)/L_n$$

with $C_n$ being the carry-over factor.

Similarly, the transferred force and moment from next node can be calculated:

$$\theta_2 = -L_n/R_n$$

$$D_2 = -0.5\theta_2 \cdot L_n$$

$$M_2 = SK_n \cdot C_n \theta_2 + T_n \cdot D_2$$

$$F_2 = T_n \cdot \theta_2 - S_n \cdot D_2$$

These transferred curvature moments and forces are iteratively added to the internal forces and fixed end moments from weight:

$$F_s = F_s + F_1 + F_2$$

$$M_s = M_s + M_1 + M_2$$

until convergence is reached for each of the nodes along the drill string.

At least some embodiments of the drill string trajectory determination module employ the nominal outer diameter of the drill string and the nominal borehole diameter, together with stiffness of the drill string and the borehole trajectory as estimated from previous iterations or in combination with other sources of trajectory information such as location information of survey stations along the borehole. Alternatively, or in addition, the drill string trajectory determination module may account for the location and size of the threaded couplings between tubulars and the location and size of any centralizers. The drill string trajectory determination module may still further account for forces on the drill string during the drilling process including gravity, buoyancy, and compression. Those of ordinary skill in the art are familiar with the use of stiff-string models and further details may be found in references such as A. McSpadden and K. Newman, "Development of a Stiff-String Forces Model for Coiled Tubing," SPE-74831-MS (2002), and L. Gorokhova, A. Parry, and N. Flamant, "Comparing Soft-String and Stiff-String Methods used to Compute Casing Centralization," SPE-163424-PA (2014).

The foregoing disclosure enables the estimation of the wellbore dogleg from the bending moment measurements from string in both drilling and real time environment. It enables better prediction for the performance of various drill ahead options and the performance of various sensitivity analyses with RSS (rotary steerable systems), mud motor, and other drill string, BHA, and bit configurations. It further enables improved borehole trajectory information for use in modeling other drilling environment parameters, including the prediction or calculation of mechanical, hydraulic and pneumatic properties.

Accordingly, the embodiments disclosed herein include:

Embodiment A

A borehole curvature logging system that includes: a drill string having a bottomhole assembly (BHA) with sensors providing actual deformation and bending moment measurements as a function of BHA position at spaced-apart intervals on the BHA; a processing system that retrieves said actual measurements and responsively generates a log of borehole curvature; and a user interface that displays the borehole curvature log. The processing system implements a method that generates the log by: providing an estimated borehole trajectory; deriving predicted deformation and bending moment measurements based on the estimated borehole trajectory; determining an error between the predicted measurements and the actual measurements; updating the estimated borehole trajectory to reduce the error; repeating said deriving, determining, and updating to refine the estimated borehole trajectory; and converting the estimated borehole trajectory into a borehole curvature log.

Embodiment B

A borehole curvature logging method that comprises: retrieving actual deformation and bending moment measurements for spaced-apart intervals on a bottomhole assembly (BHA) as a function of BHA position; obtaining an estimated borehole trajectory; deriving predicted deformation and bending moment measurements based on the estimated borehole trajectory; determining an error between the predicted measurements and the actual measurements; updating the estimated borehole trajectory to reduce the error; repeating said deriving, determining, and updating to refine the estimated borehole trajectory; converting the estimated borehole trajectory into a borehole curvature log for display or storage on a nontransient information storage medium.

Each of the foregoing embodiment may further include any of the following additional elements alone or in any suitable combination: 1. The method includes displaying the borehole curvature log. 2. The method includes storing the borehole curvature log on a nontransient information storage medium. 3. The BHA further includes navigation sensors, and wherein said obtaining includes processing measurements from the navigation sensors. 4. Said deriving includes performing a three-dimensional finite element analysis to determine curvature of the BHA based on the estimated borehole trajectory. 5. Said deriving includes employing a stiff-string model to determine curvature of the BHA based on the estimated borehole trajectory. 6. Said deriving includes determining side forces on the drill string, including drag and torque. 7. Said deriving accounts for tool joint dimensions and spacing. 8. The borehole curvature log specifies, as a function of position along the borehole, a rate at which the borehole trajectory changes in degrees per unit length. 9. The borehole curvature log specifies, as a function of position along the borehole, a radius of curvature.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A borehole curvature logging system that comprises:
   a drill string having a bottomhole assembly (BHA) with sensors providing actual multi-component force and bending moment measurements as a function of BHA position at spaced-apart intervals on the BHA;
   a processing system that retrieves said actual measurements and responsively generates a log of borehole curvature by:
      providing an estimated borehole trajectory;
      deriving predicted multi-component force and bending moment measurements based on the estimated borehole trajectory;
      determining an error between the predicted measurements and the actual measurements;
      updating the estimated borehole trajectory to reduce the error;
      repeating said deriving, determining, and updating to refine the estimated borehole trajectory; and
      converting the estimated borehole trajectory into a borehole curvature log; and
   a user interface that displays the borehole curvature log.

2. The system of claim 1, wherein the BHA further includes navigation sensors, and wherein said providing is based in part on measurements from the navigation sensors.

3. The system of claim 1, wherein as part of said deriving, the processing system employs a three-dimensional finite element analysis to determine curvature of the BHA based on the estimated borehole trajectory.

4. The system of claim 1, wherein as part of said deriving, the processing system employs a stiff-string model to determine curvature of the BHA based on the estimated borehole trajectory.

5. The system of claim 1, wherein as part of said deriving, the processing system determines side forces on the drill string, including drag and torque.

6. The system of claim 1, wherein as part of said deriving, the processing system accounts for tool joint dimensions and spacing.

7. The system of claim 1, wherein the borehole curvature log specifies, as a function of position along the borehole, a rate at which the borehole trajectory changes in degrees per unit length.

8. The system of claim 1, wherein the borehole curvature log specifies, as a function of position along the borehole, a radius of curvature.

9. A borehole curvature logging method that comprises:
   retrieving actual multi-component force and bending moment measurements for spaced-apart intervals on a bottomhole assembly (BHA) as a function of BHA position;
   obtaining an estimated borehole trajectory;
   deriving predicted multi-component force and bending moment measurements based on the estimated borehole trajectory;
   determining an error between the predicted measurements and the actual measurements;
   updating the estimated borehole trajectory to reduce the error;
   repeating said deriving, determining, and updating to refine the estimated borehole trajectory;
   converting the estimated borehole trajectory into a borehole curvature log for display or storage on a nontransient information storage medium.

10. The method of claim 9, further comprising displaying the borehole curvature log.

11. The method of claim 9, further comprising storing the borehole curvature log on a nontransient information storage medium.

12. The method of claim 9, wherein the BHA further includes navigation sensors, and wherein said obtaining includes processing measurements from the navigation sensors.

13. The method of claim 9, wherein said deriving includes performing a three-dimensional finite element analysis to determine curvature of the BHA based on the estimated borehole trajectory.

14. The method of claim 9, wherein said deriving employs a stiff-string model to determine curvature of the BHA based on the estimated borehole trajectory.

15. The method of claim 9, wherein said deriving includes determining side forces on the drill string, including drag and torque.

16. The method of claim 9, wherein said deriving accounts for tool joint dimensions and spacing.

17. The method of claim 9, wherein the borehole curvature log specifies, as a function of position along the borehole, a rate at which the borehole trajectory changes in degrees per unit length.

18. The method of claim 9, wherein the borehole curvature log specifies, as a function of position along the borehole, a radius of curvature.

\* \* \* \* \*